3,426,540
TIDEWATER POWER GENERATION SYSTEM
Arthur E. Fixel, 2163 Penobscot Bldg.,
Detroit, Mich. 48226
Continuation-in-part of application Ser. No. 523,682,
Jan. 28, 1966. This application Jan. 27, 1967, Ser.
No. 612,133
U.S. Cl. 61—20                    8 Claims
Int. Cl. E02b 9/08; F03b 13/12; H02p 9/04

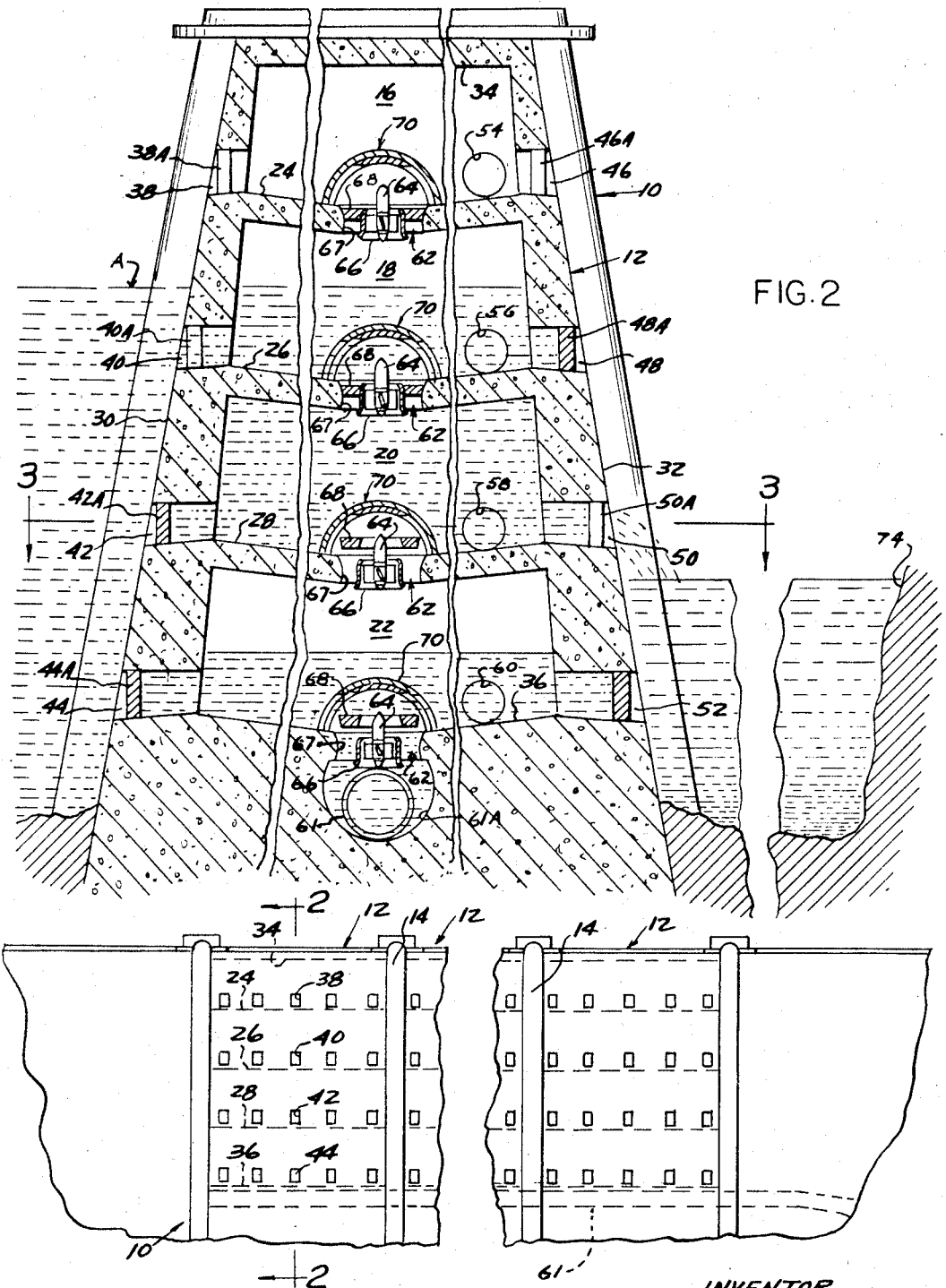

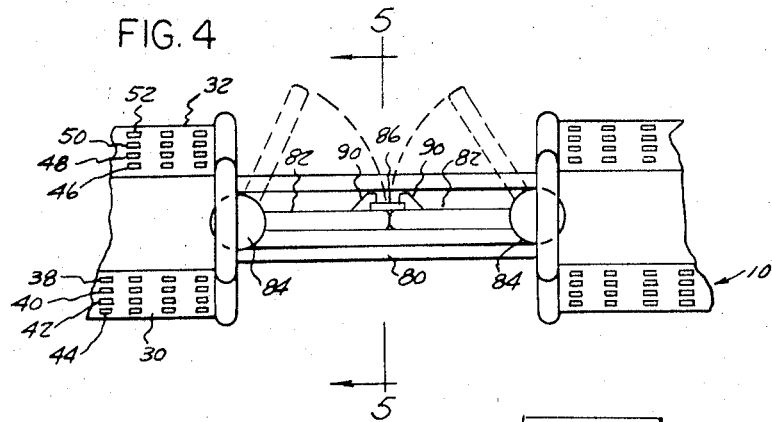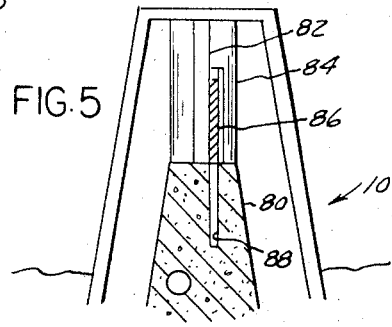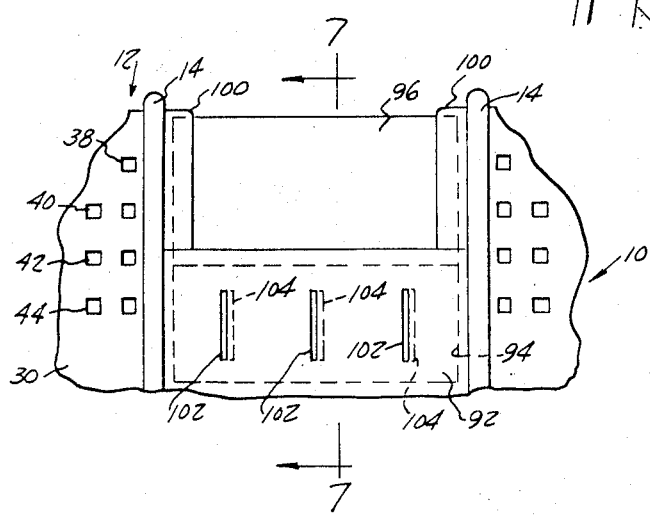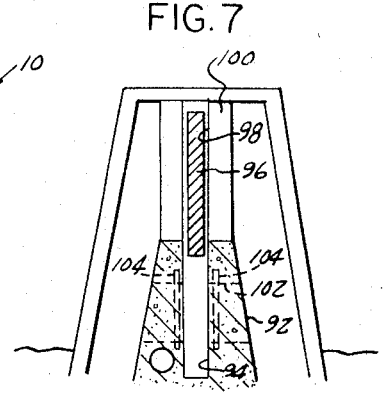

ABSTRACT OF THE DISCLOSURE

A dam structure between the body of water in the sea and a natural or artificial reservoir or estuary, the dam structure having numerous vertically and laterally wall-separated chambers with power generating turbines in the horizontal walls between adjacent chambers, a plurality of individually controllable gates on both the seawater and the reservoir sides of the chambers and between adjacent chambers, with interior enclosures to selectively close the turbines from water flow between chambers, and bypass means for bypassing the turbines in permitting waterflow between the vertically adjacent chambers, and the dam having a large gate for rapid transfer of water from one side to the other when desired.

RELATED APPLICATIONS

This application is a continuation-in-part of application Ser. No. 523,682, filed Jan. 28, 1966, and now abandoned.

BACKGROUND OF THE INVENTION

1. *Field of the invention*

This invention relates to the generation of electrical power from the rise and fall of the tides, and more particularly to an improved flow controlling means for ensuring minimum intervals between periods of power generation. Most tidewater power generation systems presently proposed or in use provide for flow of tidewater through a tunnel in which is stationed the turbine power generator. Some of the problems with such systems include the amount of "down time" when the tide is changing from inflow to outflow and vice versa. In the present invention such down time is materially reduced, and the multiple turbine generators and effective valving are intended to provide for greater versatility, continuity, efficiency and economy through selective control over the power generation.

SUMMARY OF THE INVENTION

The present invention reduces "down time" by providing for massive storage of tidewater at high tide by introducing water into a natural or artificial water reservoir through giant water gates which close as the tide commences to ebb and subsequent discharge and use through small water valves, of the stored water; and also the retention and release of water in and from chambers in the dam structure for use during periods of small tidewater to reservoir water level differences. Multiple gates, use of a plurality of vertically and horizontally separated chambers within the dam structure, with various bypassing and turbine isolation devices embodied in the structure, plus large floodgates or the like provided in the structure, enable operators to obtain maximum effective use of the waterhead available between the tidewater and the reservoir sides of the dam, and between the exterior and the interior of the dam.

For a more complete understanding of the invention, reference may be had to the accompanying drawings illustrating a preferred embodiment of my invention in which like reference characters refer to like parts throughout the several views and in which:

FIGURE 1 is an elevational fragmentary view of a preferred dam structure made in accordance with the present invention;

FIGURE 2 is a cross-sectional fragmentary view taken substantially on the line 2—2 of FIGURE 1;

FIGURE 4 is a fragmentary diagrammatic top view of a dam structure embodying another feature of my invention;

FIGURE 5 is a cross-sectional view taken substantially on the line 5—5 of FIGURE 4;

FIGURE 6 is a fragmentary top view of a dam structure embodying another modification; and FIGURE 7 is a cross-sectional view taken substantially on the lines 7—7 of FIGURE 6.

Figure 3:
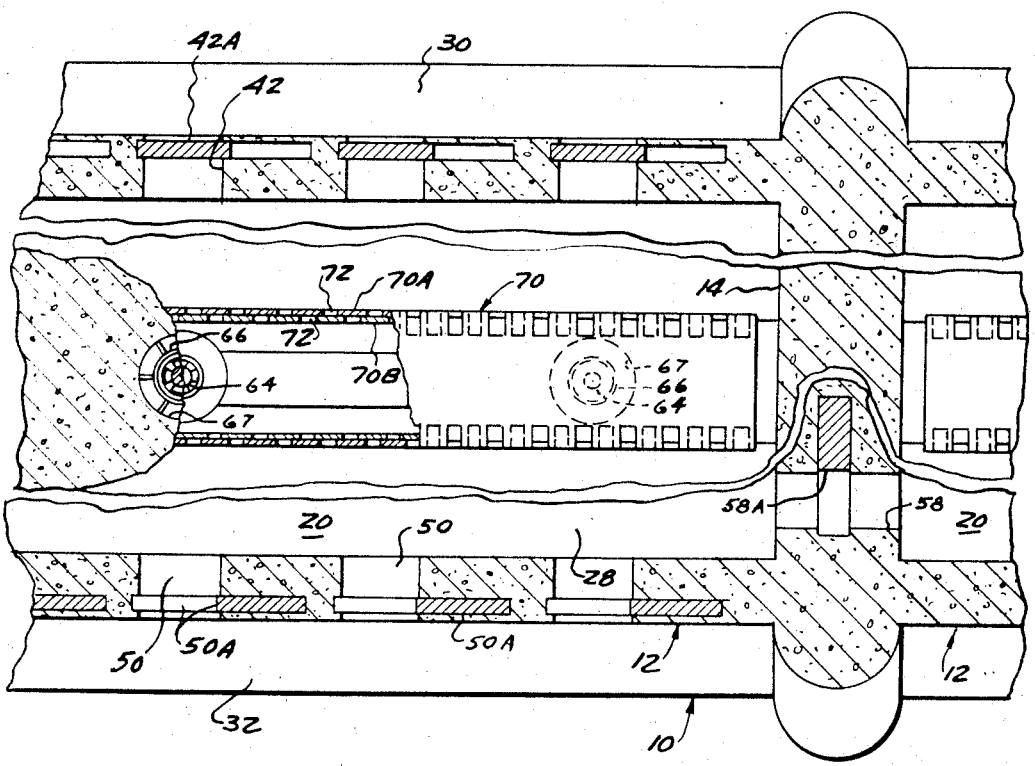
FIGURE 3 is a fragmentary cross-sectional view taken substantially along the line 3—3 of FIGURE 2.

A dam structure 10 is illustrated in FIGURES 1–3 diagrammatically as having been erected across the mouth of an inlet, bay or estuary open to the sea, which inlet or the like may be naturally found in many parts of the world in locations where tidewater rise and fall is quite high. In some locations the rise and fall of the tide is about 40 to 60 feet, which provides a sufficient water head across the dam in periods of tidal motion, to operate power generating turbines.

The length of the dam, or a portion thereof, is divided into a plurality of laterally spaced sections 12, preferably separated by reinforced concrete vertical walls 14 which also give structural strength to the dam as a whole. Each section 12 of the dam has a plurality of vertically spaced chambers 16, 18, 20, and 22, more or less as desired; separated by substantially horizontal wall structures 24, 26, and 28, as indicated in FIG. 2. The outer walls of the chambers are defined by sloped but substantially vertical faces 30 and 32 of the dam, which are intended to be very widely spaced such that the chambers are rather extensive for the storage of large volumes of water. The upper chamber 16 preferably has a roof 34, and the lower chamber 22 is provided with a floor 36. Each horizontal wall 24, 26, and 28, and the floor 36 is preferably sloped as shown in FIG. 2 toward the longitudinal center line of the dam.

The dam face 30 is provided with a plurality of openings 38, 40, 42, and 44 leading respectively into the lower portions of the chambers 16, 18, 20, and 22. The dam face 32 has a similar set of openings 46, 48, 50, and 52 leading respectively into the same chambers 16, 18, 20, and 22. Selectively movable gate valves 38A, 40A, 42A, 44A, 46A, 48A, 50A and 52A are provided to close the respective openings with which they are related when it is desired to prevent water entry or egress from the respective chamber, and to be opened when it is desired to admit or release water from the respective chambers. These gate valves may be of any preferred type such as are associated with dam spillways and the like. Shown as examples are horizontally slidable gates. These may be opened any degree desired dependent on the flow desired.

The vertical walls 14 are provided with passages 54, 56, 58, and 60 respectively connecting horizontally adjacent chambers, the passages being provided with movable gate valves, respectively designated 54A, 56A, 58A, and 60A, which can be opened to permit flow of water between adjacent chambers, or closed to isolate adjacent chambers from each other.

A longitudinal drain pipe 61 is preferably provided in the floor 36, which pipe may be used to carry water to any receiver such as a distant reservoir or lowland, or to a desalination plant or the like. At convenient positions, the pipe 61 widens to form chambers 61A under the lower chambers 22.

The horizontal walls 24, 26, and 28, and the floor 36, each have at least one opening 62 therein to connect the vertically adjacent chambers. The openings 62 contain turbine-generator structures 64 adapted to be driven by water, passing under the force of gravity, from one chamber to the chamber below, or even passing upwards from a lower chamber subjected to the pressure of higher water levels exteriorly of the dam or in other chambers. Each turbine generator structure 64 preferably comprises a vertical duct 66 centrally located within the opening 62 and spaced from the periphery thereof to provide a circumferential bypass passage 67 between the duct 66 and the periphery of the opening 62, such that water may be selectively directed through the turbine-generator rotor within the duct 66, or bypassed through the passage 67 on opening of a bypass valve 68.

An elongated semi-cylindrical cover structure 70 or the like is preferably provided in each chamber to cover the openings 62 and their associated turbine-generators, and in a preferred form comprises a pair of overlapping semi-cylindrical members 70A and 70B, one of which is selectively axially movable, so that slots 72 therein can be registered with or displaced from similar slots 72 in the other semi-cylindrical member. When the slots 72 are registered, water in the chamber can flow to the turbine-generators 64 or to the bypass passages 67. It will be seen that the cover structures 70 could be flat and located below the turbines 64 rather than above, and would operate in the same fashion.

Having thus described the structural components of the system, which are shown not necessarily in the precise form in which they may be engineered but only as examples of such workable structures, the operation of the present system will be clear from an examination of FIG. 2, in which for the sake of explanation the openings to the sea are shown on the left and the openings to a natural or artificial reservoir 74 are shown on the right.

The various gate valves in the dam walls 30 and 32, which have been described, may be selectively opened or closed to admit or discharge water to or from any chamber, either from or into the sea, or from or into the reservoir. Thus, gates on the seaward side may be closed, for example, as the tide rises, until there is sufficient height differential between the sea and the reservoir, whereupon the uppermost submerged gate on the seaward side would be opened to admit water into the respective chamber, and the cover 70 in that chamber would be arranged to permit water to flow toward the turbine-generator 64, which is disposed between the chamber and the next lower chamber, which is assumed to be initially empty. The respective bypass valve associated with this turbine-generator would of course be closed. Water would then be directed to flow through the turbine-generator causing it to produce power, and into the chamber which is beneath, and from thence the water would flow out into the reservoir 74 through the appropriately opened gate valve. Depending on the water head produced, one, two or more turbine generators 64 in either horizontally equal levels or in successive vertical levels and/or in any selected combinaiton thereof might be caused to be activated. Water can be transferred from any chamber into either the next lower chamber or into the laterally adjacent chamber, such that any one or more of the turbine-generators will be operated. If the gates on the seawater side are closed until the tide has risen, then a lowermost gate opened, water may be made to flow upward to a higher chamber, operating the turbine between the chambers until the useful head of water is dissipated, folowing which the lowermost seawater side gate can be closed and the lowermost reservoir side gate opened to permit water to drain to the reservoir, additionally opening an upper seawater side gate for continuing water supply to operate the turbines again through gravity-flowing water through selected turbines. Water can also be stored in a chamber during high tide periods for subsequent release into the next lower chamber and then outward therefrom at any time that either the tidewater or reservoir side of the dam has a lower level of water. Therefore by proper synchronization and operation of valves, a substantially constant generation of power can be produced regardless of the time of the rise and fall of the tides.

In FIG. 2 it will be seen that different events are occurring at the same time. The upper chamber 16 has been emptied of any water it might have stored during previous high tides. The chamber 18 is receiving water through the opening 40 from the sea water side where the tide has risen to the level A. The cover 70 in chamber 18 is arranged to the open position, and the bypass valve 68 is closed in the wall 25, so that water is directed to the center to operate the turbine-generator 64 on the flow of water downward to the chamber 20, from which the water is emptying through the opening 50 into the reservoir 74, the gate 50A being opened and the gate 42A being closed. The cover 70 in the chamber 20 is also closed. The chamber 22 is clased from both the sea water side, the reservoir side, and the chamber 20, but is opened to bypass water around the lowermost turbine-generator 64 in the floor 26, into the drain 61.

It will be apparent that at any time there is a reasonable water level differential across the two sides of the dam or between any chamber and either side of the dam, or between the chambers of any adjacent dam sections, selected turbine-generators may be operated by selective operation of gate valves. At times when the water differential is too small, water which has been stored in one chamber may be permitted to flow downward into any empty chamber for interim operation of selected turbine-generators until the water differential across the dam or between chambers and either side of the dam has changed. Also it will be apparent that whether the tide is rising or ebbing, the turbine-generators may be operated either by causing tidewater to flow through the system into the reservoir, or by causing water to flow from the reservoir out to sea, or by causing water to flow vertically into or out of any chamber under gravity or other pressure head available to the operators.

Also, when the tide is at a maximum, it is possible to rapidly fill the reservoir by opening many or even all of the gate valves on both the sea wall side and reservoir side of the dam, permitting rapid equalizations of water levels.

The gates, the by-pass valves, and the turbine covers may also be selectively opened and closed to varying degrees to control the flow induced turbine operation dependent on generated power requirements at any time.

Since there may be times when the water level on the sea water side is considerably higher than the water level on the reservoir side of the dam structure, and yet generated power requirements are not high, or water may not be able to be transferred rapidly enough from the tidewater side to the reservoir side to completely fill the reservoir side prior to the ebbing of the tide, it may be desirable to provide one or more large gate sections in the dam which can be opened when desired to produce a rapid equalization of water levels between the sea water and the reservoir sides without opening any of the gates to the chambers. Such a gate or gates may also be used to provide a large influx of water to the reservoir in a hurry, with subsequent slower release through the smaller gates to achieve more continuity of power generation.

FIGURES 4–7 illustrate two preferred gate structures in diagrammatic form. FIGURES 4 and 5 show a broad section in which the chambers previously described are eliminated, and instead a vertically shortened dam portion 80 has, extending upwardly therefrom, a pair of swinging gate members 82 carried on upstanding rotatable cylinders 84 on either side of the gap between the sections of the dam 10. A locking plate 86 or the like may be arranged to rise from a recess 88 provided in the dam section 80 to engage with keepers 90 mounted on the gates to retain the gates in closed position, and to be lowered when the gates 82 are to be swung open, or any other locking device may be used. It will be apparent, of course, that the gates may be swung either toward the reservoir side or toward the sea water side of the dam depending upon which way the water will be flowing, since there may arise a time when the water level on the reservoir side is higher than the sea water side when a large volume of water is desired to be transferred toward the sea water side as a flood control measure, for example.

FIGURES 6 and 7 illustrate another modification in which a lower dam section 92 has a central recess 94 from which and into which a vertical sliding gate member 96 may be respectively raised and lowered, the sides of the gate 96 being guided in slots 98 provided in vertical stationary side pillar members 100. Since the recess 94 may fill with water and otherwise interfere with the lowering of the gate 96, sets of slots 102 may be provided through the dam section 92 and arranged to be selectively opened and closed by slide plates 104 provided for the purpose.

It has been noted that in some tidewater generation systems, provisions are made for pumping water from one side of a dam structure to the other side using excess power previously stored, or taken from some other power source. In my invention, during periods of time when power needs are low, and there is a high water level on one or the other side of the dam structure, any number of the large chambers provided in the dam structure may be filled with water, and in a period of higher power needs when the water differential across the dam is too small to provide a sufficient volume of flow to operate the turbines, the water from the higher chambers in the dam structure may be released through selected turbines to give the necessary interim power.

In the event a turbine-generator requires maintenance or repair, the appropriate cover 70 may be closed and workmen may work inside (the spaces being enclosed by the covers being of sufficient size for this purpose), or the appropriate chamber may be sealed off entirely and evacuated of water. Passages and elevators, and appropriate access doors (not shown) in the wall and partition structures of the dam, may be provided for admitting personnel to the necessary operating components.

It will therefore be apparent to one skilled in the art that a complete control over power generation is hereby provided in such a way that a substantially constant production of power can be achieved, providing continuity, economy and efficiency, rather than having intervals of power generation and intervals of down time as in other systems.

Although I have described only a few preferred embodiments of my invention, it will be apparent to one skilled in the art to which the invention pertains, that various changes and modifications may be made therein, without departing from the spirit of the invention or the scope of the appended claims.

I claim:

1. A system for tidewater power generation in a suitable natural or artificial reservoir location open to the sea, comprising
   (a) a dam separating said reservoir from the sea and having a substantially vertical sea wall and a substantially vertical reservoir wall defining a large interior space between them,
   (b) a plurality of vertically spaced substantially horizontal walls spacing said vertical walls and separating said space into a plurality of vertically adjacent chambers between the sea and reservoir walls,
   (c) each horizontal wall having a duct connecting adjacent chambers,
   (d) a turbo-generator in each duct for actuation by water gravitating or rising through said duct,
   (e) valve means in said vertical walls selectively individually opening or closing each chamber to the sea and to the reservoir sides of said dam, and
   (f) valve means associated with each horizontal wall duct to selectively individually open or close communication therethrough between vertically adjacent chambers,
   (g) said valve means being operable to regulate water flow into and out of individual chambers through either vertical wall and through said horizontal walls for selective admission and storage of volumes of water within selected chambers and selective release therefrom, for actuation of selected turbo-generators.

2. The system as defined in claim 1 and in which said horizontal walls include by-pass valve means associated with said ducts for selectively by-passing water around said turbo-generators in flowing between vertically adjacent chambers.

3. A system as defined in claim 1 and having
   (a) a second plurality of vertically adjacent chambers within said dam and laterally adjacent the first plurality of chambers,
   (b) substantially vertical walls spacing said sea and reservoir walls to define and separate said laterally adjacent chambers,
   (c) walls, ducts, turbo-generators and valve means associated with the second plurality of chambers and similar to the walls, ducts, turbo-generators and valve means of the first plurality of chambers, and
   (d) valve means in each of said last mentioned vertical walls for selectively communicating each of the first plurality of chambers with respectively each of the laterally adjacent second plurality of chambers.

4. A system for tidewater power generation in a suitable natural or artificial reservoir location open to the sea, comprising
   (a) a dam separating said reservoir from the sea,
   (b) a plurality of vertically adjacent chambers within said dam,
   (c) a wall separating vertically adjacent chambers and having a duct connecting said chambers,
   (d) a turbo-generator in said duct for actuation by water gravitating or rising through said duct,
   (e) valve means selectively opening each chamber to the sea and to the reservoir,
   (f) a drain selectively connected to the lowermost chamber for draining water therefrom, and
   (g) turbo-generator means in said drain for actuation by water emptying into said drain.

5. A system for tidewater power generation in a suitable natural or artificial reservoir location open to the sea, comprising
   (a) a dam separating said reservoir from the sea,
   (b) a plurality of vertically adjacent chambers within said dam,
   (c) a wall separating vertically adjacent chambers and having a duct connecting said chambers,
   (d) a turbo-generator in said duct for actuation by water gravitating or rising through said duct,
   (e) valve means selectively opening each chamber to the sea and to the reservoir,
   (f) cover means assocaited with each of said turbo-generators, and
   (g) means selectively opening said cover means to admit water flow through said turbo-generators.

6. A system for tidewater power generation in a suitable natural or artificial reservoir location open to the sea, comprising
   (a) a dam separating said reservoir from the sea,
   (b) a plurality of vertically adjacent chambers within said dam,
   (c) a wall separating vertically adjacent chambers and having a duct connecting said chambers, (d) a turbo-generator in said duct for actuation by water gravitating or rising through said duct,
(e) valve means selectively opening each chamber to the sea and to the reservoir,
(f) cover means associated with each of said turbo- passing water around said duct and between said chambers,
(g) a cover means associated with each of said turbo-generators and the by-pass means associated therewith, and
(h) means selectively opening said cover means to admit water alternatively through said turbo-generator or through said by-pass means.

7. The system as defined in claim 1 and in which said dam includes a chamberless portion having a single large gate selectively operable to directly connect the seawater and reservoir sides of said dam.

8. The system as defined in claim 6 and in which said cover means are selectively variable openable to control water flow volume through said turbo-generators.

References Cited

UNITED STATES PATENTS

| | | | |
|---|---|---|---|
| 1,659,481 | 2/1928 | Defour | 61—20 |
| 1,794,313 | 2/1931 | Moharram | 61—19 |
| 2,072,930 | 3/1937 | Voorduin | 61—19 |

FOREIGN PATENTS 219,323   1/1925   Great Britain.

JACOB SHAPIRO, *Primary Examiner.*

U.S. Cl. X.R.

253—4; 290—42